Oct. 24, 1950 R. P. HEUER 2,527,063
PROCESS OF MAKING REFRACTORY BRICK FOR USE IN
SUSPENDED FURNACE ROOFS
Original Filed July 3, 1944 2 Sheets-Sheet 1
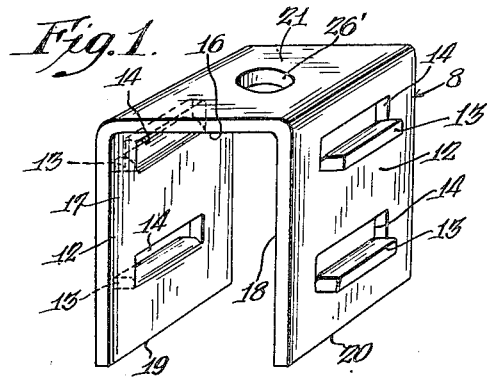
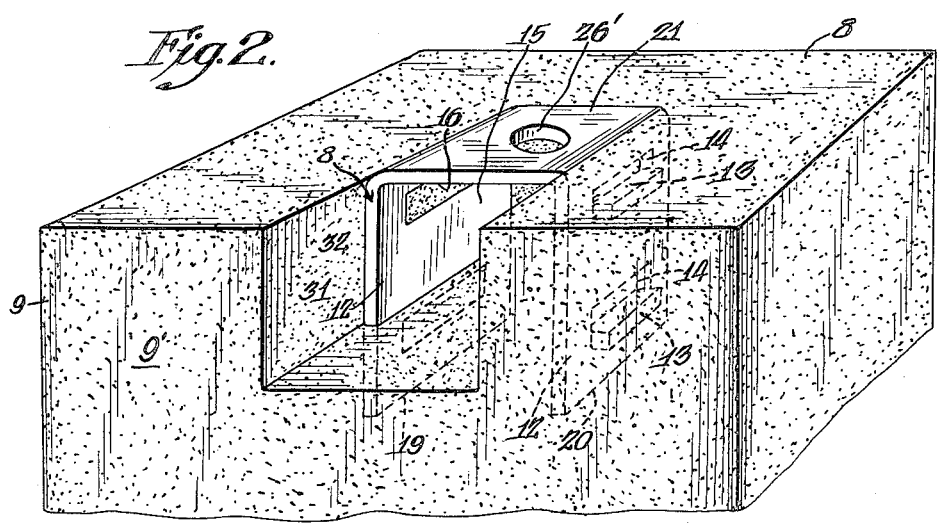
Inventor
Russell Pearce Heuer
by
Attorneys.

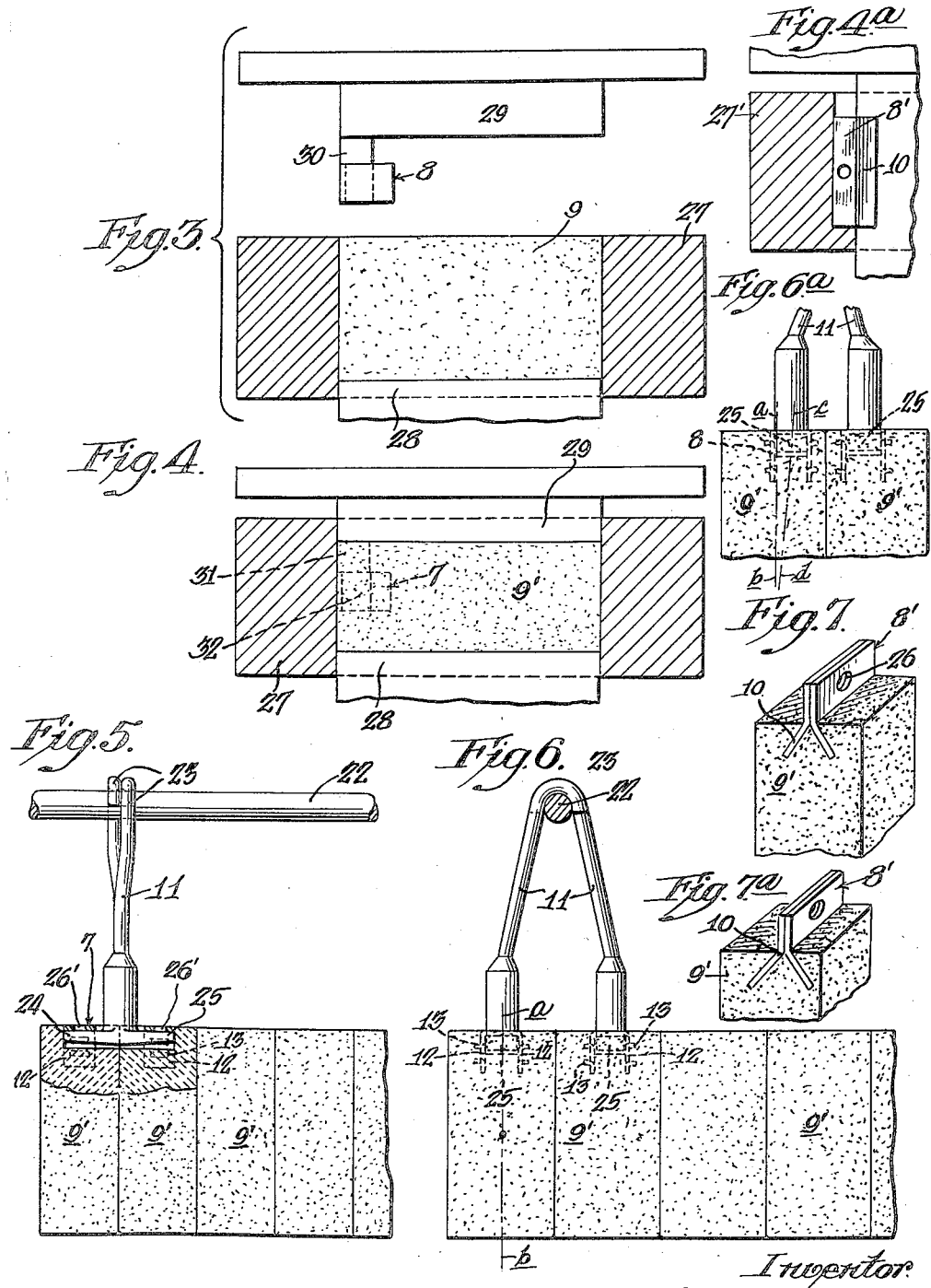

Patented Oct. 24, 1950

2,527,063

UNITED STATES PATENT OFFICE 2,527,063

PROCESS OF MAKING REFRACTORY BRICK FOR USE IN SUSPENDED FURNACE ROOFS

Russell Pearce Heuer, Villa Nova, Pa., assignor to General Refractories Company, a corporation of Pennsylvania Original application July 3, 1944, Serial No. 543,241. Divided and this application November 14, 1947, Serial No. 786,107

2 Claims. (Cl. 25—156)

My invention relates to methods of making refractory bricks capable of use in suspended roofs and for mechanically supported other furnace walls.

A purpose of the invention is to mold refractory brick for use with suspension means, using the mold having two opposite plungers, by molding the brick on itself between the plungers, placing a metallic insert adapted for use with suspension means at one end of the mold, pressing the movable plungers together under a pressure in excess of 1500 pounds per square inch and thereby embedding the insert within the refractory, withdrawing the brick and the comolded insert from the mold and finishing the brick at a temperature lower than that at which the insert would be injured.

A further purpose is to mold an insert for suspension purposes within the end of a refractory brick by fastening the insert removably on one of the removable parts of the brick mold, pressing the parts together to imbed the insert within the brick refractory while supporting the insert from the removable mold part, keeping a recess within the insert open by the support of the insert, pressing the brick with the included insert at pressure in excess of 1500 pounds per square inch, withdrawing the support for the insert and finishing the brick at a temperature lower than that at which the insert would be injured.

A further purpose is to mold a brick having a hollow insert within it in a mold having two movable plungers by molding the brick on its side, supporting the insert from one of the molding plungers whose engagement with the insert maintains a hollow within the insert and whose support from the plunger represents a maintained lateral path of access to the insert, pressing the brick between the plungers while the insert and the support therefor are in place, giving the brick a pressure of not less than 1500 pounds per square inch, withdrawing the plunger which supported the insert, pushing the brick out of the mold with the other plunger and withdrawing the brick at a temperature lower than that which will objectionably affect the insert.

A further purpose is to sustain molding pressure in and around an insert by a mold projection which extends within and initially carries the insert into the mold and which maintains a recess inside the insert during molding.

A further purpose is to provide a co-molded metallic socket located at the cool end of the brick in such a manner as to obtain a maximum effective distance between the socket and the heated end of the brick.

Further purposes appear in the specification and in the claims.

I have preferred to show but two forms of insert, selecting forms which are practical and reliable, but which have been selected by reason of their excellence in illustrating the invention.

Figure 1 is a perspective of one form of insert.

Figure 2 is a fragmentary perspective of one end of a brick containing the insert of Figure 1.

Figures 3 and 4 are side elevations of a mold used in explaining the molding process.

Figure 4ᵃ is a side elevation of another form of mold than that in Figure 4.

Figures 5 and 6 are fragmentary views at right angles to each other showing the insert of Figures 1 and 2 in use.

Figure 6ᵃ is a fragmentary view showing the inserts of Figures 5 and 6 as offset with respect to the major axes of the brick.

Figures 7 and 7ᵃ are fragmentary perspectives showing a second form of insert.

The present application is a division of my copending application Serial No. 543,241, filed July 3, 1944, Patent No. 2,517,876 for Refractory brick for use in suspended furnace roofs. The parent application retains the subject matter directed to the product, the present division being directed to the process.

The use of suspended roofs and other mechanically supported parts of high temperature furnaces is widely practiced. There are many well-known advantages to such construction. Diverse means of suspension and support have been proposed.

Generally a metallic hanger is provided and the refractory brick are so shaped and arranged as to be engaged by the hanger at a substantial distance from the extreme end of the brick so that enough refractory is engaged by the hanger to give the proper strength for support. By so doing, the efficiency of utilizing the refractory which lies between the hanger and the extreme end of the brick is largely wasted. In the course of the furnace operation the refractory material at the hot face of the brick wears away. As the brick gets thinner the temperature of the metallic hanger rises and at some point exceeds its safe working temperature. It is then customary to replace the wornout brick with new brick. This involves both the cost of the brick and the labor cost of replacement.

In case where the refractory comprises relatively cheap substances such as fireclay, the efficiency of utilization of the refractory brick has not been so important. More recently, however, refractory substances comprising chrome ore and/or magnesia described as non-acid refractories as set forth in my U. S. Patents 2,154,813 and 2,155,165, have been used in suspended roofs. These materials are more expensive and the efficiency of their utilization is important.

I have found that it is possible to improve the efficiency of utilization of the refractory in suspended roofs and similar mechanically supported parts of furnaces, saving not only in brick but also in labor for replacement. To do this I provide an insert which is located nearer to the cool end of the brick than is the part of the brick otherwise engaged by the hanger, thereby obtaining a maximum effective thickness of refractory between the hanger and the heated end of the brick.

My preferred form of hanger-engaged insert within the brick comprises a metallic socket 8 as shown in Figure 1. The metal may be rolled steel or malleable cast iron (these are commonly described as ferrous metals), or heat resistant alloy or other desired material. I co-mold this metallic means with the refractory material 9 under pressure to form the refractory brick 9'. A section of such a brick, showing the co-molded socket in it, is shown in Figure 2. By co-molding I imbed at least a part of the hanger socket in the refractory and thus provide a definite point of support which is located near to, at or even outside of the cool end of the brick. A second form of insert 10 having contact outside of its brick is seen at 8' in Figure 7.

The insert may be U-shaped as in Figure 2, or otherwise shaped, such as the Y in Figure 7 or a T, V, L or I for other examples. The insert should be shaped so as to cooperate with the hanger or support used for the brick.

The insert must sharply define the shape and position of the surface to be engaged by an outside hanger 11 as well as the exact position within the brick at which hanger engagement takes place.

The two legs 12 of the U-shaped piece in Figure 1 may be provided with tabs 13 and/or recesses 14 (Figure 1), the walls of each of which, when co-molded, engage the refractory and hold the socket firmly in place. In Figure 2 the refractory does not entirely fill the space between the legs of the U-shaped socket. A void space 15 is provided. Into this space 15 the hanger or support 11 may be fitted, making contact with the under surface 16 of the bend and inner side surfaces 17, 18.

Both the extension of the tabs laterally outwardly into the body of the brick and the projection of the body of the brick within the recesses left by bending them out, serve thoroughly to seat and hold the socket within the brick. One pair of tabs and one pair of recesses lie between the space 15 and the relatively "free" ends 19, 20 of the legs, as distinguished from the end of the socket at which the legs are united by the transverse strap 21.

Figures 5 and 6 show one method of assembling the bricks on the hangers to form a suspended roof. Figure 6 is a view taken at right angles to that of Figure 5. In both figures a conventional supporting bar or rod 22 is shown. Hangers 11 of suitable heat-resistant metal are suspended by hooks 23 from the bars or rods. The T hangers are interchangeable but as used the hooks are offset in different directions. They carry oppositely facing projections 24 and 25 at their lower ends. These projections are shaped to fit the inserts, passing in through the molded recesses in the brick and into the interiors of the inserts, i. e. into spaces 15.

For ease in assembling, the hanger projections are formed as fairly snug, slightly tapered fits within the inserts. They prevent the bricks from sliding off the hangers before the bricks are put in position in the roof, and prevent the inserts from tilting or turning under pressure during molding.

Two bricks may be hung from each hanger. The hangers may be grouped in pairs as shown, with the hooks 23 engaging the bar from the left and from the right. In this way a simple roof construction is obtained. The assembly is easy and a small number only of supports—and hangers—is required.

Not only can other shapes of hanger sockets co-molded with their brick be used but other types of supporting members and various ways of disposing the hangers from the supporting means will serve the purpose. The insert may extend beyond the end of the brick as shown in Figure 7. The insert 7' is here engaged by the hanger at the opening 26, as, indeed, the insert 7 can be engaged through opening 26'.

The bricks can be hung singly or in pairs or groups and the hangers can be assembled on the supporting members conventionally. In any of the forms the insert is co-molded with the brick and preferably is provided with means for locking itself firmly to the refractory, as for example the tabs and/or recesses as shown in Figure 1.

The method of co-molding the insert and the refractory to produce the brick shown in Figure 2 is illustrated in Figures 3 and 4. In Figure 3 a mold box 27 of proper dimension is indicated. This mold is closed at the bottom by a plunger 28. The top of the mold may be closed by a top plunger 29. One or both plungers is or are actuated by a hydraulic press or suitable mechanical press. The use of two opposite molding plungers is highly desirable in the present invention. The press should be sufficient to exert a forming pressure on the brick of at least 1500 pounds per square inch in order to insure adequate imbedding of the insert. A forming pressure of 5000 pounds per square inch is more desirable and up to 10,000 pounds per square inch or more is preferred.

The prepared refractory mix, ready for forming, is charged into the mold opening. The top plunger is provided with a plug 30 of proper dimension to form the opening 31 through the top at the side of the brick and also to reach into the insert to support the socket and keep brick mix out of the recess 32. The opening 31 gives a space by which after the pressing operation the plug 30 can be withdrawn from the brick and by which lateral access may be had through the side of the brick at the end as shown in Figure 2.

The insert 7 is preferably supported on this plug It may be held in place upon the under side of the upper plunger and at any desired distance below it. There is a decided advantage in having the point of support high up in the brick or even above its surface in that the metal is thus spaced to a maximum from the furnace heat.

Since the side of the brick is uppermost in Figures 3 and 4, the distance of the insert below the upper die in these figures represents the distance of the insert in from the side, placing the insert in line with the major axis a—b of the brick, for example, in Figures 5, 6 and 7, so as to provide a line of support through the center of gravity coinciding with the major axis line of the brick.

On the other hand, if the inserts be placed at different distances from the sides or edges of the brick so that the inserts lie outside of the major axis of the bricks in Figures 6ª and 7ª, the bricks are canted to an angle 0 determined by the extent that the insert lies outside of said axis. The angle 0 is the angle between the major axis and the line of support c—d between the point of support and the center of gravity.

The insert plug may be held in place beneath the top plunger by magnetic or other means. The insert and plug interfit snugly so that there is light friction between them.

In order to co-mold the insert and the refractory the top plunger is moved down under pressure to the position shown in Figure 4. By so doing the insert is imbedded in the refractory and is held firmly in position. The top plunger and plug are then withdrawn, leaving the formed brick with the hanger recess in the mold. The bottom plunger then moves upward and the brick is discharged from the mold. It is important that the plug used to form the recess be tapered or shaped in such a way as to permit its withdrawal from the formed brick without damage to the refractory.

The refractory composition is so chosen that the brick is suitable for use without high temperature kiln firing.

A typical composition of chrome-magnesite refractory is the following:

|  | Per cent |
|---|---|
| Chrome ore, 6.28 mesh | 60 |
| Dead-burned magnesite through 50 mesh | 40 |

To this mixture is added 2% air-floated kaolin and a solution of sulfuric acid sufficient to provide about 4% of moisture and 1% of sulfuric acid in the prepared mix. Other compositions and types of refractory may also be used.

After molding, the refractory brick are dried at about 300° F. or other suitable temperature, preferably under conditions of controlled humidity. After drying, the bricks are ready for use without high temperature kiln firing. It is necessary to avoid any high temperature kiln treatment which would melt the hangers imbedded in the brick or oxidize the metal enough to cause it to suffer a loss in strength or utility.

The finished brick are recommended for use in suspended roofs of metallurgical and other furnaces such as copper smelting and refining furnaces, open hearth steel melting furnaces, heating furnaces and other equipment where the ability to cant the brick by reason of the position of their suspension inserts with respect to their axes has special value.

The bricks may also be used in the construction of mechanically supported furnace walls, as, for example, the end walls and front or back walls of open hearth furnaces. Mechanically supported walls comprising brick which are held in place by forces of tension applied to the individual bricks in the wall are better than conventional unsupported walls which are held in place largely by compressive forces created by the force of gravity or the action of buck-stays, tie-rods, etc. Such mechanically supported walls give longer life with less spalling of the brick, the working dimensions of the furnace are maintained with greater accuracy during the furnace campaign and the destruction of furnace walls by charging machines is materially lessened. The use of a brick comprising a co-molded insert or supporting means in such walls is simple and cheap and the refractory present is efficiently utilized.

It is highly desirable that the insert within the brick, of whatever shape, should be put in during the molding of the brick, so that the compression of the brick may press the refractory tightly against and about the insert and that the refractory walls engaging the insert may have the surface characteristics due to the considerable pressure exerted in molding the brick.

With the higher pressures the spaces which otherwise occur between the particles of the brick are eliminated to a large extent by crowding other particles into the spaces which would otherwise be left, not only giving denser brick structure but giving correspondence of the wall of refractory next to the insert much closer than could otherwise be attained. There is, therefore, not only greater density of the brick itself but greater average density of the brick unit considered as a combined structure.

The method of making by compressing the brick mix against the insert under a pressure of from 1500 pounds to 10,000 pounds, or more, pressure per square inch intimately joins the refractory and the insert, leaving the brick in closest contact with the insert.

An additional capability where the refractory is non-acid and the insert is ferrous metal or other oxidizable metal is that oxidation of the metal of the insert at the high temperature of use will tend to make it weld with the refractory and will improve (rather than impair) the firm contact between the insert and the refractory, since the volume of the oxide is greater than that of the original metal.

In view of my invention and disclosure variations and modifications to meet individual whim or particular need will doubtless become evident to others skilled in the art, to obtain all or part of the benefits of my invention without copying the process shown, and I, therefore, claim all such insofar as they fall within the reasonable spirit and scope of my claims.

Having thus described my invention what I claim as new and desire to secure by Letters Patent is:

1. The method of molding a suspended refractory brick having a hanger recess and an adjacent hollow metallic insert, using a mold having upper and lower relatively moving plungers, which comprises mounting the insert around a projection from one of the plungers, introducing refractory into the mold, relatively moving the plungers together under a pressure in excess of fifteen hundred pounds per square inch and thereby bringing the insert into its final position in the refractory with the hanger recess defined by the projection and the insert around the projection embedded in the refractory and then relatively moving the plungers apart to detach the insert from the projection, withdraw the projection from the hanger recess and permit removal of the brick from the mold.

2. The method of forming a refractory brick having a hanger recess and a hollow metallic insert surrounding the recess, using a mold having relatively movable upper and lower plungers and having a projection on the upper plunger, which comprises molding the brick with the side having access to the hanger recess uppermost, affixing the insert on the projection with the hollow of the insert occupied by the projection, introducing refractory into the mold, relatively moving the plungers together until a pressure in excess of fifteen hundred pounds per square inch has been applied, embedding the insert in the refractory, forming the hanger recess by the shape of the projection and positioning the insert by its attachment to the projection, and then relatively moving the plungers in the direction opposite to their relative movement together, thereby withdrawing the plunger from the hanger recess, detaching the insert from the projection and permitting removal of the brick side uppermost from the mold.

RUSSELL PEARCE HEUER.

REFERENCES CITED

The following references are of record in the file of this patent:

UNITED STATES PATENTS

| Number | Name | Date |
| --- | --- | --- |
| 301,936 | Swasey | July 15, 1884 |
| 2,247,376 | Heuer | July 1, 1941 |
| 2,336,864 | Holmes | Dec. 14, 1943 |

FOREIGN PATENTS

| Number | Country | Date |
| --- | --- | --- |
| 413,174 | Great Britain | July 12, 1934 |
| 35,022 | Netherlands | Mar. 15, 1935 |